United States Patent [19]

Kim

[11] Patent Number: 5,547,640

[45] Date of Patent: Aug. 20, 1996

[54] COMPACT HIGH TEMPERATURE AIR PURIFIER

[76] Inventor: Dae S. Kim, 49 Floral St., Newton, Mass. 02161

[21] Appl. No.: 369,655

[22] Filed: Jan. 6, 1995

[51] Int. Cl.$^6$ ............................ B01D 50/00; B01D 53/02
[52] U.S. Cl. ............................ 422/177; 423/173; 423/176; 55/523; 95/113; 96/124; 96/125; 96/152
[58] Field of Search ............................ 422/177, 168, 422/169, 170, 171, 173, 176, 211; 55/523; 95/113; 96/124, 125, 150, 152; 110/210; 432/72, 180

[56] References Cited

U.S. PATENT DOCUMENTS

| | | | |
|---|---|---|---|
| 4,093,435 | 5/1978 | Marron et al. | 96/125 |
| 4,125,593 | 11/1978 | Scheifley et al. | 423/481 |
| 4,329,162 | 5/1982 | Pitcher, Jr. | 55/523 |
| 4,364,761 | 12/1982 | Berg et al. | 55/523 |
| 4,662,899 | 5/1987 | Tandon | 55/80 |
| 4,948,392 | 8/1990 | Rush | 55/34 |
| 5,389,125 | 2/1995 | Thayer et al. | 95/11 |

FOREIGN PATENT DOCUMENTS

| | | | |
|---|---|---|---|
| 27293451A | 1/1978 | Germany | 96/125 |

*Primary Examiner*—Robert Warden
*Assistant Examiner*—Christopher Y. Kim
*Attorney, Agent, or Firm*—Brian M. Dingman

[57] ABSTRACT

An extremely compact, energy efficient air purifier for incinerating volatile organic chemical contaminants, and airborne organic particulates comprises a cylindrical ceramic heat transfer/storage element having many substantially identical axially parallel flow passages with very large surface area per mass, and a rotating guide for guiding the inlet air flow to a preset radial segment of the ceramic element. The air flow exiting from the preset radial segment is directed to the remaining segment in the opposite direction. The air flow exiting from the remaining segment is exhausted from the air purifier. Included is a pre-heater for heating the ceramic element at start up, and maintaining the air flow at a stable incineration temperature.

8 Claims, 1 Drawing Sheet

COMPACT HIGH TEMPERATURE AIR PURIFIER

BACKGROUND OF THE INVENTION

1. Field of Invention

The present invention relates to an air purifier and in particular to a compact high temperature incinerator for both gaseous organic contaminants and airborne particulates.

2. Description of the Prior Art

Indoor air quality is becoming a serious health concern as residences and work places became more air-tight to conserve heating or cooling energy. Common gaseous air contaminants include VOC (volatile organic compounds or chemicals) from furnitures and carpets in offices and homes or from industrial processes and commercial operations, such as painting, printing, and cleaning. Common airborne particulates include smoke, human and animal hair, bacteria, fibre fragments, pollen and many other minute solid particles known as dust.

Prior art air purifiers vary widely in sizes, designs and applications. They range from portable room air purifiers to very large integrated industrial air cleaning systems which are, sometimes, legally required. Regardless of their size, in most prior art air purifiers, the gaseous contaminants are removed either by a total incineration or a selective adsorption. The solid particulates are removed by a filtration with a medium or with the aid of an electrostatic field.

In these prior art air purifiers, both the filters and the electrostatic traps must be cleaned or replaced regularly. The adsorbent, such as activated charcoal, must be regenerated or replaced. Additional power is needed to overcome the pressure drop which is caused by the filter and the trapped particles. The pressure drop is, sometimes, minimized by a pleated filter with a large surface area. Very fine, sub-micron, particles are very difficult to filter and requires more power for an electrostatic separator or a specially fine medium.

To burn the gaseous and the fine airborne organic contaminants, the air stream must be heated to and kept at a high temperature. A higher temperature and higher rate make the system more compact but requires more added heat and costly high temperature materials of construction. The added heat is carried away by the exiting purified air as its sensible heat or lost to the surrounding.

At present, high prices and costly routine replacement parts and services of air purifiers make them less popular. Although an incinerating air purifier is simple, effective and complete, it requires an additional supply of heat.

DISCLOSURE OF THE INVENTION

The present invention incinerates both VOCs and the fine airborne particulates at a high temperature with minimum added fuel, pollution, space, time and labor.

In this invention, a rotating flow guide with a semi-circular opening directs a pre-filtered dirty air stream to one half of a cylindrical ceramic heat storage/transfer element, which has many substantially identical axially parallel flow passages with very large surface area per mass. This incoming dirty air keeps this entire end of the ceramic element near the ambient temperature. On the other end of the elements, a gas tight ceramic cup provides a combustion chamber and reverses the flow to the other half of the element back to the cool end in the opposite direction as all organic contaminants are incinerated.

An opening at the middle of the cup is used for adding heat to preheat the chamber and the adjacent ceramic element for start-up and for maintain the preset incineration temperature by adding more heat or removing a portion of the hot gas. An optional oxidation catalyst on the cup wall and the walls of the air passages near the hot end can speed the initial warm-up and combustions at lower temperatures but the pure thermal oxidation is fast enough without catalyst at temperatures above 1600 degrees F. Also in most commercial incineration with high VOC, no additional heat is required.

In a normal operation, the axial temperature profile of the ceramic element has a flat near ambient temperature on the cool end, a flat incineration temperature at the hot end and a sharp drop in the middle where the most heat is transferred. The both temperature profiles of the dirty and the clean streams have a similar shape. This is typical in a transient heat transfer process between a ceramic element with very large surface per mass and an alternating flow. The flat areas represent near equilibration. The best analogy would be a syphon.

The pre-filtered dirty air picks up heat from the ceramic and raises its temperature progressively as it travel toward the hot end, where all organic contaminants are incinerated. The hot clean gas cools down as it travels to the cool end progressively by giving its sensible heat to the ceramic element. A faster rotation of the flow guide and a larger surface area per mass increases the capacity of this air purifier.

To minimize the added heat, either by an electric heating element or by a combustion of fossil fuel in sustaining the high preset combustion temperature, the hot parts are insulated.

DESCRIPTION OF THE PREFERRED EMBODIMENT

Figure 1:
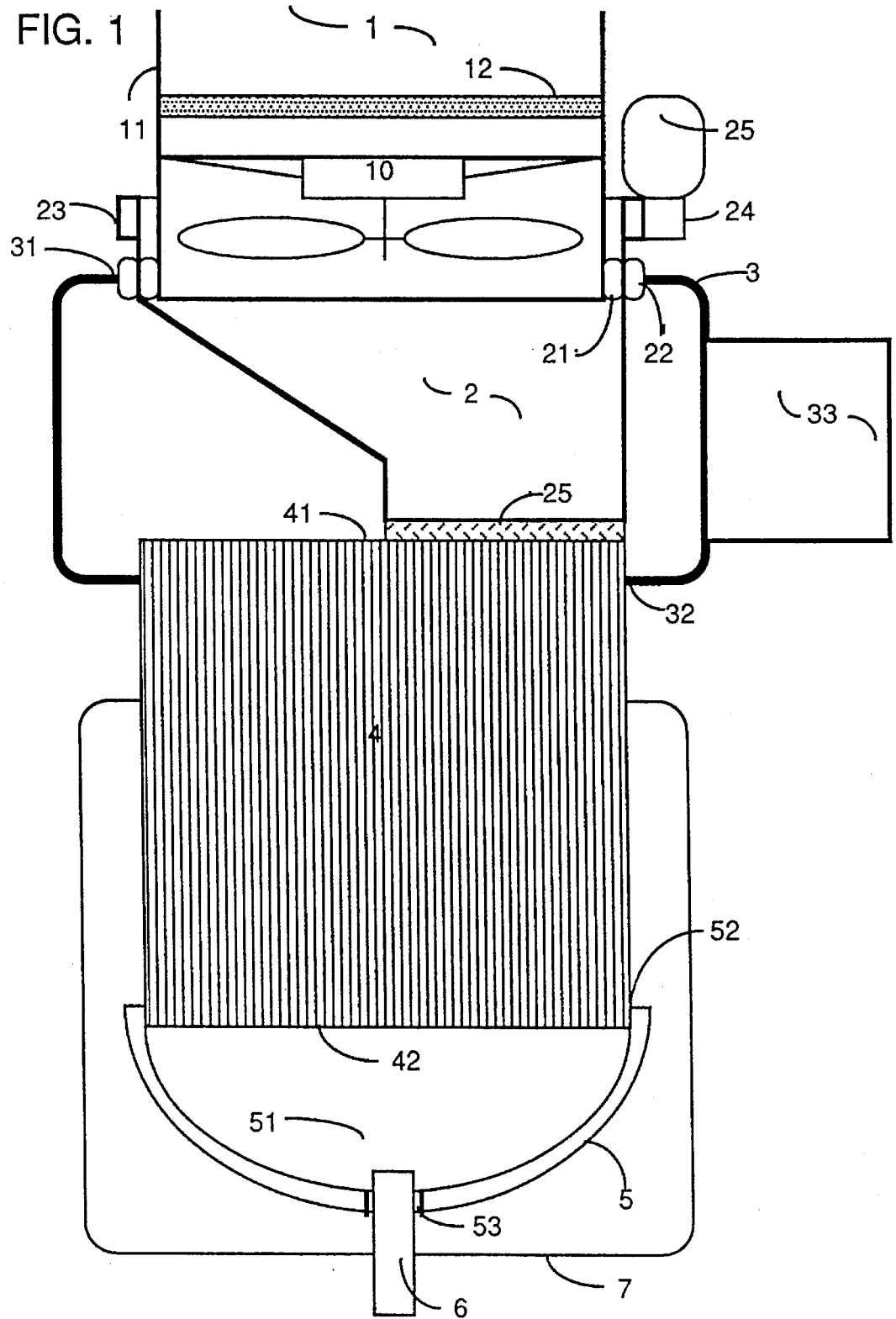
FIG. 1 is a schematic cross-sectional view cutting through the mid plane to illustrate the inter-relation of components of this invention.

In FIG. 1 the ambient dirty air is drawn in through a stationary inlet 1 and a coarse filter 12 by an inlet blower 10 which is securely mounted on the stationary inlet duct 11 and is directed to semi-circular radial segment of a cylindrical ceramic heat transfer/storage element 4 by a rotating flow guide 2 which is rotatablly restrained internally by the stationary inlet duct 11 and externally by an opening 31 of an exhaust plenum 3. The flow guide 2 is supported by and between a pair of nylon sleeve bearings 21 and 22 is rotated by a set of mating gears, a large ring gear 23 which is mounted on the top edge of the guide 2 and a small pinion 24 which is attached to and driven by a gear motor 25. The pair of bearings 21 and 22 also seals the two annular spaces at the same time. To prevent a leakage of the inlet air, the semi-circular lower edge of the guide 2 is extended with a soft felt skirt 25. The exhaust plenum 3 has a exhaust outlet 33 and an bottom opening 32 which is attached around the outer wall of the ceramic elements 4 and is gas-tight.

The ceramic element 4 has many substantially parallel flow passages and very large wall area for heat transfer per mass. CELCOR ceramic honeycomb element from Corning Glass, Inc. provides about 1000 square feet per cubic foot of ceramic honeycomb which is less than ten pounds. The lower end 42 of the element 4 is covered by a ceramic cup 5 to provide a combustion chamber 51. The interior rim 52 of the cup 5 should be mated with the exterior wall of the element to prevent gas leakage. The cup 5 has an opening 53 in the middle to allow an insertion of a heat supplier 6, which can be an electric heating element or a combination of igniter and fuel injector. This opening 53 can also be used to clean out the solid debris from the combustion chamber 51. An insulation 7 minimizes the heat loss from the hot zone.

In operation, the entire cool end 41, the top side, is cooled continuously by the slowly rotating incoming dirty air and the hot end 42, the bottom side, is continuously heated by the combustion of the contaminants, and the added heat if needed. The axial temperature profiles of the ceramic elements, the dirty air and the cleaned air along the passages are very similar and should have a flat hot end, a flat cool end and a sharp drop in the middle. As more gas passes through, the sharply dropping middle shift away from that inlet. The flow guide 2 must rotate fast enough to maintain the flat temperature profiles at the both ends. Commercially available Cordierite or Mulrite can withstand hot end temperature of about 2,000 degree F. At this combustion temperature, a pure thermal incineration of organic contaminants is complete, extremely fast without an oxidation catalyst and requires a minimal volume of the combustion chamber. The temperature difference between the incoming dirty air and the exiting clean gas is the major part of the heat loss. A dirty air stream with VOC equivalent to 250 part per million of hydrocarbon by weight can self-sustain the incineration with 20 degree F. of the temperature difference.

While the above description contains many specificities, these should not be construed as limitations of the scope of the invention, but rather as an exemplifications of one preferred embodiment thereof. Many other variations are possible. For example the orientation of the axis of rotation can be other than vertical or reversed. Similarly, the direction of flow and alternating means of flow can be selected to fit a particular application. Accordingly, the scope of the invention should be determined not by the embodiment illustrated, but by the appended claims and their legal equivalents.

I claim:

1. An air purifier comprising:
   a. a cylindrical ceramic heat transfer/storage element having a plurality of axially parallel flow passages,
   b. means for establishing an inlet air flow,
   c. rotative means for guiding said inlet air flow to an inlet radial segment on a first end of said ceramic element to pass through said flow passages and out of the opposite end of said ceramic element,
   d. means for reversing said air flow exiting from said inlet radial segment in to another radial segment of said ceramic element in the opposite flow direction at the opposite end of said ceramic element to direct said air flow through said flow passages and out said first end of said another radial segment of said ceramic element,
   e. means for discharging said air flow exiting from said first end of said ceramic element, and
   f. means for heating said ceramic element at purifier start up to heat said air flow sufficiently to incinerate gaseous organic contaminants and airborne particulates to clean the air.

2. The device of claim 1 wherein said inlet radial segment is one half of said ceramic cylinder.

3. The device of claim 2 wherein said rotative means comprises:
   a conduit having a circular opening with a ring gear and a pair of rotatively supporting and sealing sleeve bearings at one end of said conduit and a semi-circular opening with a soft air sealing extension on the other end of said conduit and a gear motor which rotates said conduit relative to said element.

4. The device of claim 3 wherein said means for discharging is a plenum having three openings, one opening for a gas tight seal around the first, cool end of said element, another opening for supporting the outer sleeve bearing of said pair and the third opening for a discharge duct.

5. The device of claim 1 wherein said means for reversing is a semi-spherical ceramic cup which seals around the opposite, hot end of said element.

6. The device of claim 5 wherein said means for heating includes an opening in said ceramic cup, and a heat source in said opening for providing heat to the inside of said ceramic cup.

7. The device of claim 5 further including insulation around said cup and the adjacent end of said ceramic element to reduce heat loss to the surrounding environment.

8. The device of claim 1 further including insulation around at least part of said ceramic element to reduce heat loss from said ceramic element to the surrounding environment.

* * * * *